United States Patent
Kim et al.

(10) Patent No.: US 11,628,780 B2
(45) Date of Patent: Apr. 18, 2023

(54) DRIVER AIRBAG WITH EMBLEM

(71) Applicant: HYUNDAI MOBIS CO., LTD., Seoul (KR)

(72) Inventors: Do Hyoung Kim, Yongin-si (KR); Seok Hoon Ko, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/409,235

(22) Filed: Aug. 23, 2021

(65) Prior Publication Data

US 2022/0063518 A1    Mar. 3, 2022

(30) Foreign Application Priority Data

Sep. 1, 2020    (KR) .......... 10-2020-0111069

(51) Int. Cl.
| | | |
|---|---|---|
| *B60R 21/203* | (2006.01) | |
| *B60R 21/215* | (2011.01) | |
| *B60R 13/00* | (2006.01) | |
| *B60Q 3/283* | (2017.01) | |

(52) U.S. Cl.
CPC .......... *B60R 13/005* (2013.01); *B60Q 3/283* (2017.02); *B60R 21/203* (2013.01); *B60R 21/215* (2013.01); *B60R 2021/21543* (2013.01)

(58) Field of Classification Search
CPC .......... B60R 21/203; B60R 21/2032; B60R 21/21656; B60R 2021/21543; B60Q 3/283
See application file for complete search history.

(56) References Cited

U.S. PATENT DOCUMENTS

| | | | | |
|---|---|---|---|---|
| 6,099,027 A | * | 8/2000 | Shirk ................... | B60R 13/005 |
| | | | | 280/731 |
| 6,145,402 A | * | 11/2000 | Nishitani ............. | B62D 1/105 |
| | | | | 74/484 R |
| 7,887,088 B2 | * | 2/2011 | Worrell ................. | B60Q 3/283 |
| | | | | 200/61.54 |
| 8,925,959 B2 | * | 1/2015 | Bosch ................... | B60Q 3/283 |
| | | | | 40/593 |
| 10,279,736 B2 | * | 5/2019 | Schneider ............ | G09F 13/04 |
| 10,507,764 B2 | * | 12/2019 | Schneider ............ | G02B 6/006 |
| 11,059,447 B2 | * | 7/2021 | Ide ....................... | B60R 21/203 |
| 11,305,718 B2 | * | 4/2022 | Ko ....................... | B60Q 3/80 |
| 2001/0052694 A1 | * | 12/2001 | Schutz ................. | B60R 21/2037 |
| | | | | 200/61.54 |

(Continued)

FOREIGN PATENT DOCUMENTS

KR    10-2011-0074888 A    7/2011

*Primary Examiner* — Barry Gooden, Jr.
(74) *Attorney, Agent, or Firm* — NovoTechIP International PLLC

(57) ABSTRACT

A driver airbag with an emblem is proposed. The driver airbag with an emblem includes: a first cover mounted to a steering wheel; an emblem arranged on an upper portion of the first cover; a second cover having an emblem hole exposing a portion or all of the emblem upward, covering the emblem or the first cover from above the emblem, and coupled to the first cover or the steering wheel; and an airbag module coupled to the steering wheel below the first cover, and configured to deploy an airbag cushion toward a front portion of an occupant while rotating the first cover or the second cover during an operation thereof.

10 Claims, 5 Drawing Sheets

(56) References Cited

U.S. PATENT DOCUMENTS

| | | | |
|---|---|---|---|
| 2006/0125217 A1* | 6/2006 | Nakamura | B60R 21/203 280/731 |
| 2007/0024034 A1* | 2/2007 | Thomas | B60R 21/21656 280/728.2 |
| 2007/0099465 A1* | 5/2007 | Ruetz | B62D 5/001 439/164 |
| 2008/0090031 A1* | 4/2008 | Hirzmann | B60R 21/21656 428/31 |
| 2009/0121459 A1* | 5/2009 | Bostick | B60Q 3/16 280/728.3 |
| 2009/0218793 A1* | 9/2009 | Kraus | B60R 21/21656 280/743.1 |
| 2009/0273165 A1* | 11/2009 | Worrell | B60R 21/21656 280/728.3 |
| 2009/0315306 A1* | 12/2009 | Worrell | B60Q 5/003 74/484 H |
| 2010/0102538 A1* | 4/2010 | Paxton | B60Q 3/283 428/31 |
| 2010/0104780 A1* | 4/2010 | Paxton | B60R 21/215 156/60 |
| 2010/0107806 A1* | 5/2010 | Corinaldi | B62D 1/06 74/552 |
| 2010/0194080 A1* | 8/2010 | Paxton | G09F 21/04 280/728.3 |
| 2010/0201105 A1* | 8/2010 | Iwazato | B60R 21/21656 280/731 |
| 2011/0109066 A1* | 5/2011 | Rick | B60R 21/21656 280/728.3 |
| 2011/0116251 A1* | 5/2011 | Rick | B60Q 3/68 280/731 |
| 2011/0210534 A1* | 9/2011 | Sauer | B60R 21/215 280/728.2 |
| 2012/0001406 A1* | 1/2012 | Paxton | B60R 13/005 252/301.36 |
| 2013/0277952 A1* | 10/2013 | Jung | B60R 21/215 280/728.3 |
| 2014/0145419 A1* | 5/2014 | Ishikawa | B60R 21/2165 280/728.3 |
| 2014/0210190 A1* | 7/2014 | Bosch | B60R 21/203 280/728.3 |
| 2014/0210191 A1* | 7/2014 | Bosch | B60R 21/203 280/728.3 |
| 2014/0375031 A1* | 12/2014 | Bichler | B60R 21/203 280/728.3 |
| 2015/0116979 A1* | 4/2015 | Farkas | G05G 1/04 362/23.14 |
| 2016/0001807 A1* | 1/2016 | Hans | B60K 37/04 74/484 R |
| 2016/0025281 A1* | 1/2016 | Gardner | B62D 1/06 362/520 |
| 2016/0121809 A1* | 5/2016 | Barros Alonso | B60R 21/203 74/552 |
| 2017/0369022 A1* | 12/2017 | Kanto | B60R 21/215 |
| 2018/0208111 A1* | 7/2018 | Lisseman | B62D 1/06 |
| 2018/0244196 A1* | 8/2018 | Jablonski | B60Q 3/233 |
| 2019/0001879 A1* | 1/2019 | Ali | B60K 37/02 |
| 2019/0001901 A1* | 1/2019 | Verwys | B60R 13/005 |
| 2019/0071112 A1* | 3/2019 | Toddenroth | B62D 1/046 |
| 2019/0322211 A1* | 10/2019 | Kim | B60Q 3/80 |
| 2019/0351860 A1* | 11/2019 | Ohki | B60Q 3/20 |
| 2020/0164824 A1* | 5/2020 | Ide | B60R 21/21656 |
| 2020/0164825 A1* | 5/2020 | Ide | B60R 21/203 |
| 2020/0172037 A1* | 6/2020 | Klaenhammer | B60R 11/0258 |
| 2020/0355867 A1* | 11/2020 | Kwon | B60Q 3/283 |
| 2020/0406848 A1* | 12/2020 | Kang | B60R 21/215 |
| 2021/0061189 A1* | 3/2021 | Fujimori | B60R 13/005 |
| 2021/0107400 A1* | 4/2021 | Erler | B60Q 3/217 |
| 2022/0080919 A1* | 3/2022 | Ko | B60Q 3/283 |

* cited by examiner

DRIVER AIRBAG WITH EMBLEM

CROSS-REFERENCE TO RELATED APPLICATIONS

The present application claims priority to Korean Patent Application No. 10-2020-0111069, filed Sep. 1, 2020, the entire contents of which is incorporated herein for all purposes by this reference.

BACKGROUND OF THE INVENTION

1. Field of the Invention

The present invention relates to a driver airbag with an emblem and, more particularly, to a driver airbag with an emblem capable of emitting light by coupling a lighting device to the emblem mounted to a steering wheel.

2. Discussion of Related Art

An airbag system is commonly used in vehicles, especially in a steering wheel. The airbag is designed to inflate during a vehicle accident to protect an occupant from a harmful impact generated by colliding with the steering wheel. Therefore, the airbag system is generally arranged in the steering wheel.

Many vehicle manufacturers want to provide their logo or trademark on the steering wheel. The logo or trademark may be an image having colors, and may be arranged at the steering wheel (such as a cover of the steering wheel used to cover the airbag system). Some logos may have metallic chrome parts to enhance their appearance. Placement of such logo improves brand awareness, and helps a vehicle occupant remember that a vehicle manufactured by that vehicle manufacturer is equipped with an airbag and thus is safe.

In order to make the manufacturer's logo stand out more, a way to light the logo or trademark was sought.

However, until now, there has been no acceptable way to light a colored part of the trademark as well as the metallic chrome parts, and there is a problem in that a lighting device mounted in a driver airbag is broken during deployment of the driver airbag.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to provide a driver airbag in which an emblem mounted to the driver airbag is coupled to a lighting device, thereby emitting light from the emblem and protecting a lighting device from being damaged during deployment of the driver airbag.

A driver airbag with an emblem according to the present invention, the driver airbag including: a first cover mounted to a steering wheel; an emblem arranged on an upper portion of the first cover; a second cover having an emblem hole exposing a portion or all of the emblem upward, covering the emblem or the first cover from above the emblem, and coupled to the first cover or the steering wheel; and an airbag module coupled to the steering wheel below the first cover, and configured to deploy an airbag cushion toward a front portion of an occupant while rotating the first cover or the second cover when the airbag module is activated.

The airbag module may include a mounting plate coupled to the steering wheel, and the first cover or the second cover may be coupled to the mounting plate.

The mounting plate may include a first coupling hook extended from an inside of the first cover toward the first cover or the second cover, the first cover may have a first coupling groove formed by penetrating a portion corresponding to the first coupling hook, and the first coupling hook may be inserted into the first coupling groove to couple the mounting plate and the first cover to each other.

The second cover may have a second coupling groove formed by penetrating a portion corresponding to the first coupling groove, and the first coupling hook may be inserted into the first coupling groove or the second coupling groove to couple the mounting plate and the first cover or the second cover to each other.

The first coupling hook may include a bent portion formed by bending an end thereof, and the bent portion may be inserted into the second coupling groove to be fixed.

The first coupling hook may include an inclined portion having an inclined surface so that a thickness thereof may be reduced in a length-extended direction.

The first cover may include an insertion rib located adjacent to the first coupling groove toward the second cover in a direction parallel to the first coupling hook and inserted into the second coupling groove.

The mounting plate may include a second coupling hook extended from an outside portion of the second cover toward the second cover, the second cover may have a third coupling groove formed by penetrating a portion corresponding to the second coupling hook, and the second coupling hook may be inserted into the third coupling groove to couple the mounting plate and the second cover to each other.

The first cover may include a first hinge portion configured to rotate a portion of the first cover when the airbag cushion is deployed, and the second cover may include a second hinge portion located at a portion corresponding to the first hinge portion and configured to rotate a portion of the second cover with the portion of the first cover when the airbag cushion is deployed.

The emblem may include fourth coupling grooves formed by penetrating portions of the emblem in contact with the first cover, and the first cover may include first welding protrusions protruding toward the emblem on portions of the first cover corresponding to the fourth coupling grooves and configured to be weld while being inserted in the fourth coupling grooves to couple the emblem and the first cover to each other.

The first cover may have fifth coupling grooves formed by penetrating portions of the first cover in contact with the second cover, and the second cover may have second welding protrusions protruding toward the first cover on portions of the second cover corresponding to the fifth coupling grooves and configured to be welded while being inserted in the fifth coupling grooves to couple the first cover and the second cover to each other.

The driver airbag may include a light emitting module coupled between the first cover and the emblem, and configured to receive power and emit light toward, wherein the light emitting module may include an electric wire connected to a power apparatus of the vehicle, a circuit board connected to the electric wire and configured to convert electric power to an electric signal, a light emitting device connected to the circuit board and configured to emit light, and a lens configured to disperse the light of the light emitting device.

According to the present invention, the driver airbag with an emblem is configured such that, the airbag module is covered with the first cover, the lighting device and the emblem are located above the first cover, the second cover is coupled to the airbag module while covering the first cover, the lighting device, and a portion of the emblem, so that the emblem can emit light.

The first cover and the second cover can be securely coupled to the mounting plate by the first coupling hook and the second coupling hook formed on the mounting plate of the airbag module.

When the airbag cushion of the airbag module is deployed, the first cover and the second cover are rotated in a direction intersecting a deployment direction of the airbag cushion, whereby the airbag module can be opened.

The first cover and the second cover are rotated on the first hinge portion formed on the first cover and the second hinge portion formed on the second cover. Accordingly, the lighting device located between the first cover and the second cover can be protected.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
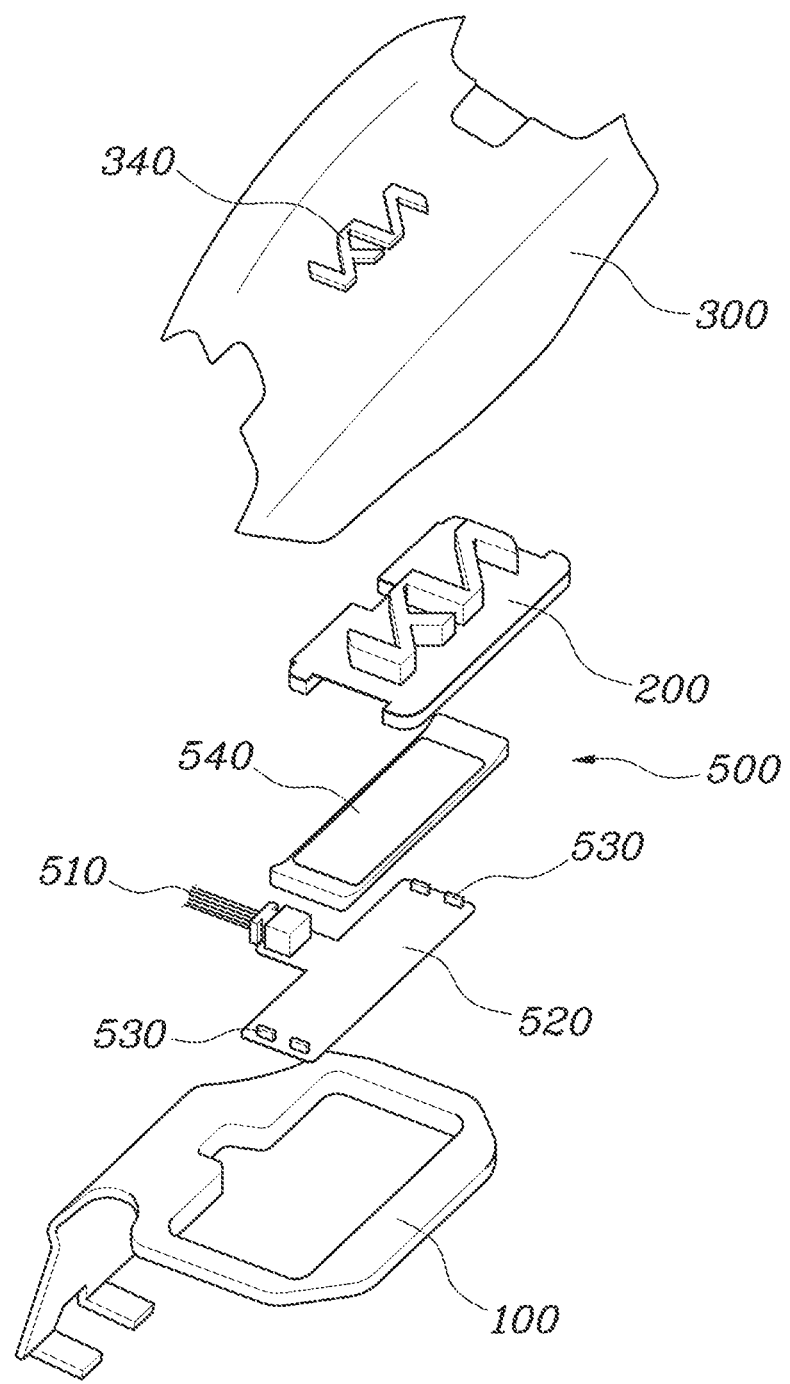
FIG. 1 is a perspective view showing a first cover, a light emitting module, an emblem, and a second cover of a driver airbag with an emblem according to an embodiment of the present invention.

In the following description, the structural or functional description specified to exemplary embodiments according to the concept of the present invention is intended to describe the exemplary embodiments, so it should be understood that the present invention may be variously embodied, without being limited to the exemplary embodiments.

An embodiment described herein may be changed in various ways and various shapes, so specific embodiments are shown in the drawings and will be described in detail in this specification. However, it should be understood that the exemplary embodiment according to the concept of the present invention is not limited to the embodiment which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be interpreted in the same manner as those described above.

The terminology used herein is for the purpose of describing a particular embodiment only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Hereinbelow, exemplary embodiments will be described hereafter in detail with reference to the accompanying drawings. Like reference numerals given in the drawings indicate like components.

Figure 2:
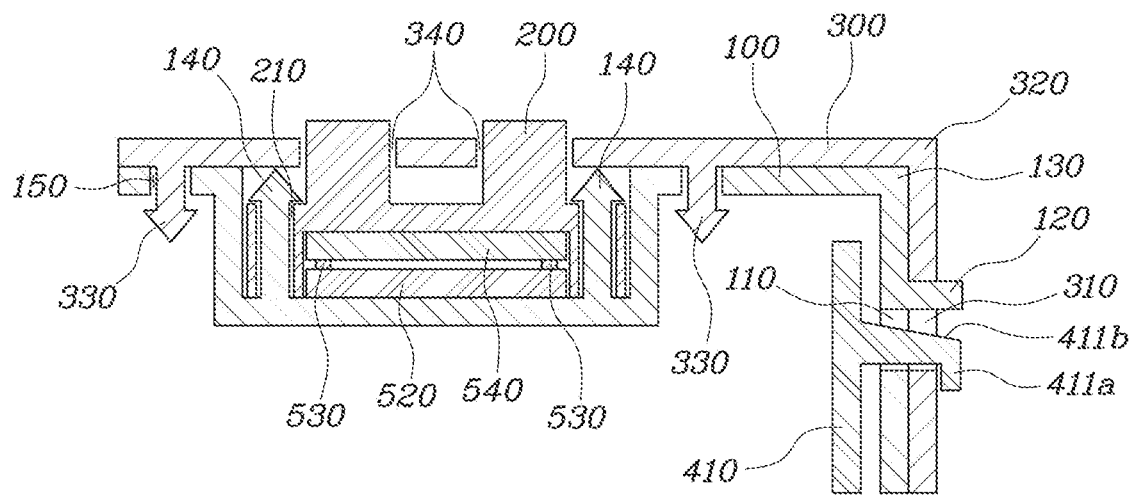
FIG. 2 is a sectional view showing an operation of the driver airbag with an emblem according to the embodiment of the present invention.
Figure 2:
Figure 2:
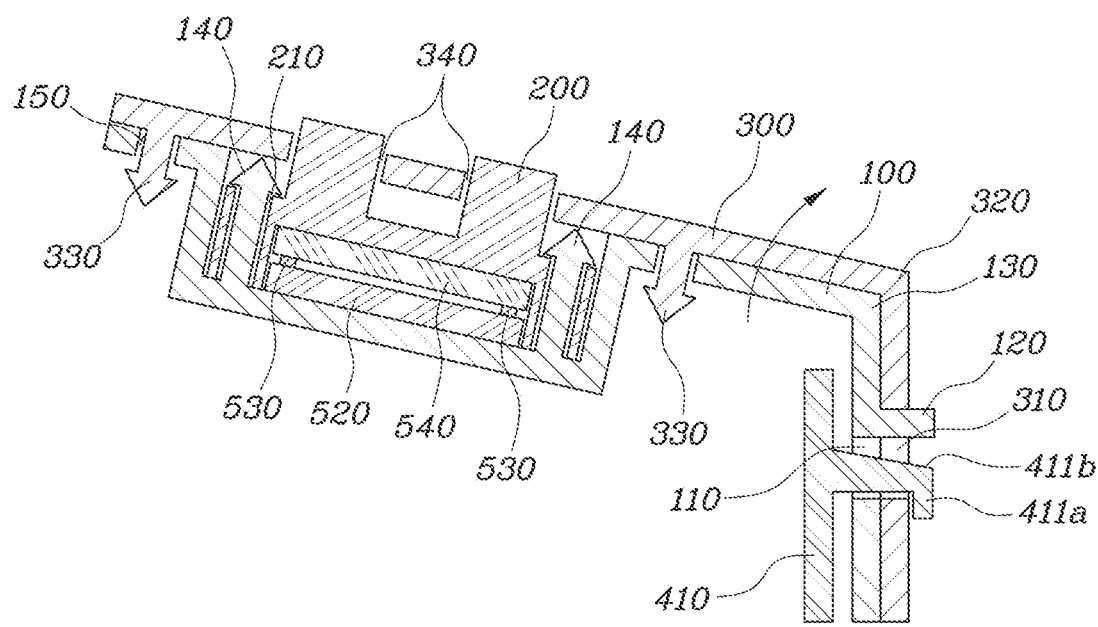
Figure 3:
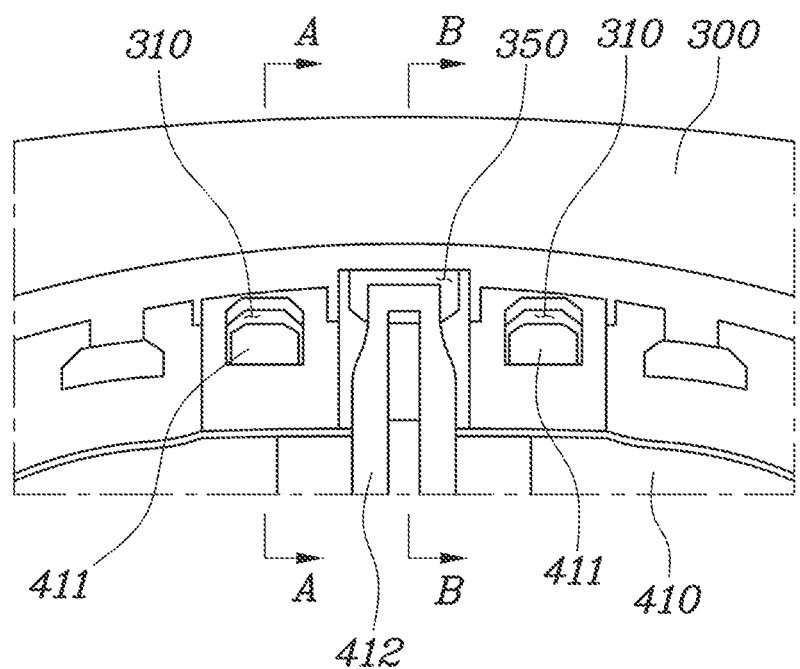
FIG. 3 is a partial view showing a portion coupling a mounting plate to the second cover of the driver airbag with an emblem according to the embodiment of the present invention.
Figure 4:
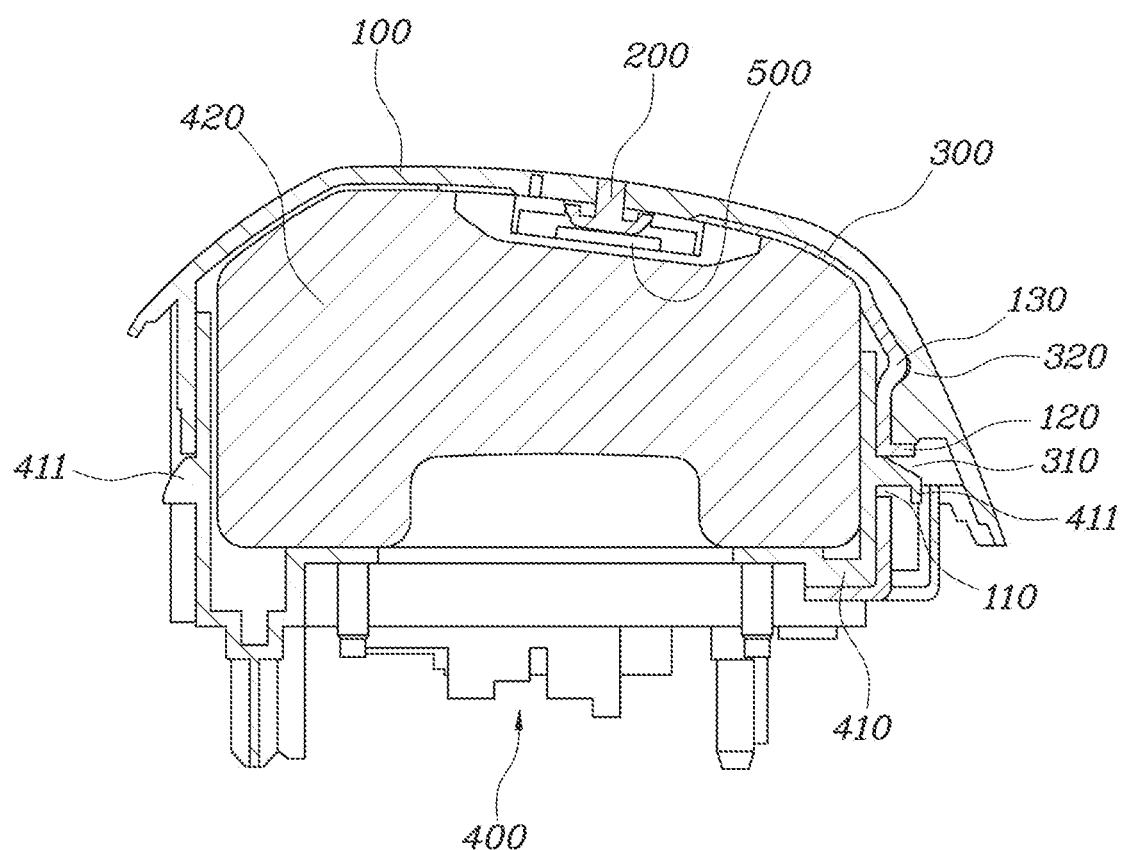
FIG. 4 is a sectional view taken along line A-A in FIG. 3.
Figure 5:
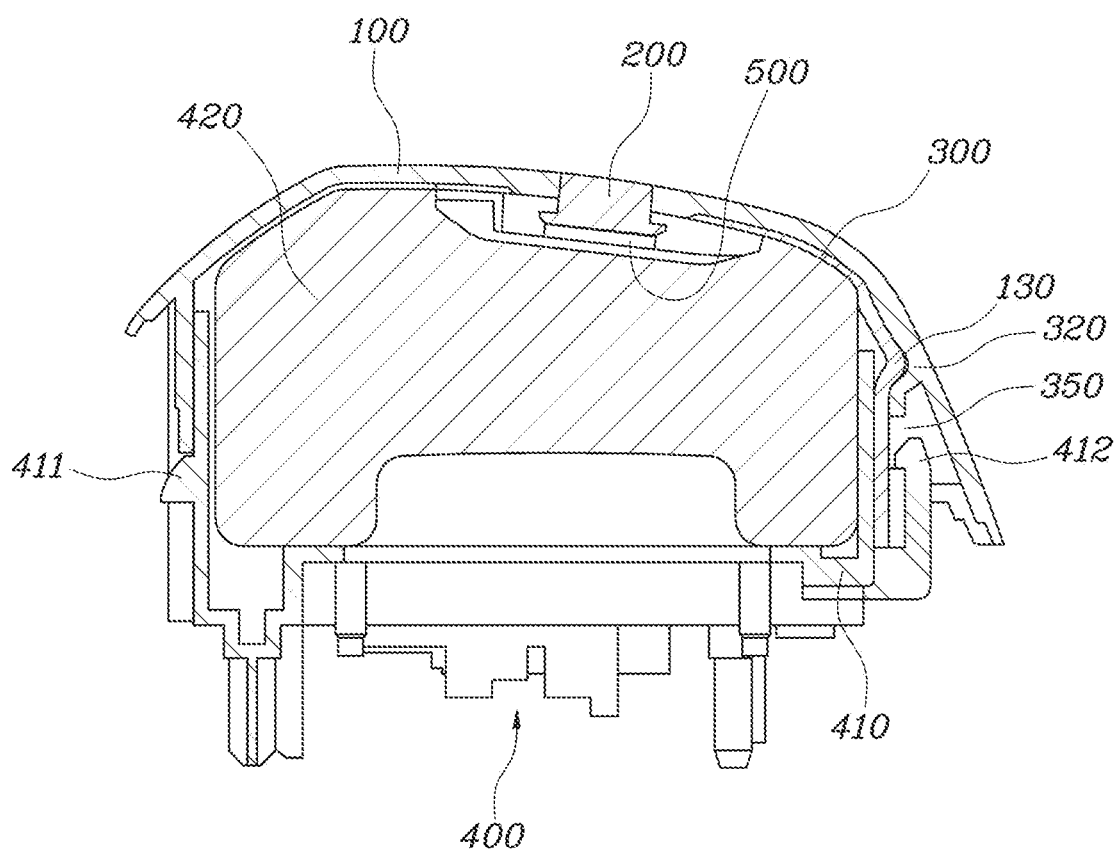
FIG. 5 is a sectional view taken along line B-B in FIG. 3.

FIG. 1 is a perspective view showing a first cover 100, a light emitting module 500, an emblem 200, and a second cover 300 of a driver airbag with an emblem according to the embodiment of the present invention. FIG. 2 is a sectional view showing an operation of the driver airbag with an emblem according to the embodiment of the present invention. FIG. 3 is a partial view showing a portion coupling a mounting plate 410 to the second cover 300 of the driver airbag with an emblem according to the embodiment of the present invention. FIG. 4 is a sectional view taken along line A-A in FIG. 3. FIG. 5 is a sectional view taken along line B-B in FIG. 3.

Hereinbelow, referring to FIGS. 1 to 5, the driver airbag with an emblem according to a preferred embodiment will be described.

Conventionally, a driver airbag with a conventional emblem is configured such that the emblem 200 is mounted to a cover of the driver airbag. However, for an aesthetic effect of a driver seat and communication between a vehicle and a driver, demand for mounting a lighting device to the emblem 200 mounted to the steering wheel is increasing.

Therefore, the driver airbag with an emblem according to present invention has the light emitting module 500 coupled to the emblem 200 mounted to the steering wheel. The driver airbag is designed to prevent the light emitting module 500 and the emblem 200 from being damaged when an airbag cushion 420 of an airbag module 400 mounted to the steering wheel is deployed.

The driver airbag with an emblem according to the present invention includes: the first cover 100 mounted to the steering wheel; the emblem 200 arranged on an upper portion of the first cover 100; the second cover 300 having an emblem hole 340 exposing a portion or all of the emblem 200 upward, covering the emblem 200 or the first cover 100 from above the emblem 200, and coupled to the first cover 100 or the steering wheel; and the airbag module 400 coupled to the steering wheel below the first cover 100, and configured to deploy the airbag cushion 420 toward a front portion of an occupant while rotating the first cover 100 or the second cover 300.

As shown in FIGS. 1 to 5, the first cover 100 may be mounted to the steering wheel, be located above the airbag module 400, and be coupled to the steering wheel while surrounding the airbag module 400.

The emblem 200 may be arranged above the first cover 100, and the emblem 200 indicates a symbol mark of a manufacturer of a vehicle.

The second cover 300 covers the first cover 100 and is coupled to the first cover 100 or the steering wheel. The second cover 300 may cover a portion of the emblem 200. The second cover 300 has the emblem hole 340 exposing a symbol mark of the emblem 200 of a vehicle, and may cover a portion other than the symbol mark of the emblem 200 and fix the emblem 200 between the first cover 100 and the second cover 300.

A light emitting device 530 is located between the first cover 100 and the emblem 200. The light emitting device 530 is supplied with electricity from a power supply of the vehicle to emit light, so that the light is released from the emblem 200.

The emblem 200 shines on the driver seat to improve the esthetic effect of the vehicle, and simultaneously, during ignition on or off of the vehicle, the driver and the vehicle may communicate with each other by the light.

The airbag module 400 is located below the first cover 100. When the airbag cushion 420 of the airbag module 400 is deployed, the first cover 100 or the second cover 300 is rotated outward and the airbag cushion 420 is deployed and thus protecting the front of the occupant.

Therefore, even when the airbag cushion 420 is deployed, the light emitting device 530 is protected by the first cover 100 and the second cover 300, so that damage to the light emitting device 530 is prevented.

The airbag module 400 includes the mounting plate 410 coupled to the steering wheel, and the first cover 100 or the second cover 300 is coupled to the mounting plate 410.

As shown in FIGS. 4 and 5, the mounting plate 410 may couple the airbag module 400 to a center portion of the steering wheel, and the first cover 100 and the second cover 300 may be coupled to the mounting plate 410.

Accordingly, the airbag cushion 420 of the airbag module 400 may be supported by the steering wheel and be located in front of the occupant during deployment of the airbag cushion.

The mounting plate 410 includes a first coupling hook 411 extended from the inside of the first cover 100 toward the first cover 100 or the second cover 300. The first cover 100 includes a first coupling groove 110 formed by penetrating a portion corresponding to a location of the first coupling hook 411. The first coupling hook 411 is inserted into the first coupling groove 110 to couple the mounting plate 410 to the first cover 100.

The first coupling hook 411 formed on the mounting plate 410 is extended from the inside of the first cover 100 toward the first cover 100 or the second cover 300, and the first coupling hook 411 may be inserted into the first coupling groove 110 formed on the first cover 100.

The first coupling groove 110 is formed to correspond to a location where the first coupling hook 411 is extended, and the first coupling hook 411 may be easily inserted into the first coupling groove 110.

The first coupling hook 411 couples the first cover 100 to the mounting plate 410. A plurality of coupling hooks 411 is provided, and the plurality of first coupling hooks 411 is partially released from a coupled state during deployment of the airbag cushion 420, so that the first cover 100 and the second cover 300 may be rotated outward.

The second cover 300 includes a second coupling groove 310 located at a portion corresponding to a location of the first coupling groove 110. The first coupling hook 411 is inserted into the first coupling groove 110 or the second coupling groove 310 to couple the mounting plate 410 to the first cover 100 or the second cover 300.

As shown in FIGS. 2 to 4, the second coupling groove 310 is formed on the portion of the second cover 300 corresponding to the portion where the first coupling groove 110 is formed. The first coupling hook 411 passes through the second coupling groove 310 simultaneously after passing through the first coupling groove 110. Accordingly, first cover 100 and the second cover 300 may be coupled to each other by the single first coupling hook 411.

Therefore, assembly of product may be improved.

The first coupling hook 411 includes a bent portion 411a formed by bending an end thereof, and is fixed after being inserted into the second coupling groove 310.

As shown in FIG. 3, an end of the first coupling hook 411 has the bent portion 411a bent in a direction intersecting an extended direction of the hook. The bent portion 411a may be supported by an outside surface of the second cover 300.

Therefore, the first coupling hook 411 may securely fix the first cover 100 and the second cover 300.

The first cover 100 may include an insertion rib 120. The insertion rib 120 is located adjacent to the first coupling groove 110 and extends toward the second cover 300 in parallel to the first coupling hook 411 and is inserted into the second coupling groove 310.

The insertion rib 120 extends toward the second cover 300 in a direction parallel to an extended direction of the first coupling hook 411. Then, the insertion rib 120 is inserted into the second coupling groove 310, and thus coupling the first cover 100 to the second cover 300.

Therefore, as the first cover 100 and the second cover 300 are coupled to each other by the first coupling hook 411 and the insertion rib 120 formed on the first cover 100 is coupled to the second cover 300, the first cover 100 and the second cover 300 are coupled to each other as duplication and coupling performance therebetween may be improved.

The first coupling hook 411 includes an inclined portion 411b, which has an inclined surface so that the thickness thereof is reduced in a length extended direction thereof.

The inclined portion 411b is inclined such that the thickness thereof is reduced in the length extended direction thereof, and the inclined portion 411b may be formed on a surface of the first coupling hook 411 facing the insertion rib 120.

Therefore, the inclined portion 411b allows the first coupling hook 411 to be easily inserted into the first coupling groove 110 and the second coupling groove 310 in insertion of the first coupling hook 411, thereby improving assembly of the product. When the first cover 100 and the second cover 300 are rotated upward during deployment of the airbag cushion 420, the inclined portion 411b may be brought into contact with the insertion rib 120 to support the first cover 100 and the second cover 300.

The mounting plate 410 includes a second coupling hook 412 extended on an outer portion of the second cover 300 toward the second cover 300 or the first cover 100. The second cover 300 includes a third coupling groove 350 formed by penetrating a portion corresponding to the second coupling hook 412. The second coupling hook 412 is inserted into the third coupling groove 350 to couple the mounting plate 410 to the second cover 300.

As shown in FIG. 3, the second coupling hook 412 is formed on the mounting plate 410 and is extended outward on the second cover 300 toward the second cover 300. In addition, as the second coupling hook 412 is inserted into the third coupling groove 350 that is formed on the second cover 300 to correspond to a position where the second coupling hook 412 is extended, the mounting plate 410 may be coupled to the second cover 300.

Therefore, by the first coupling hook 411, the mounting plate 410, the first cover 100, and the second cover 300 are coupled to each other primarily, and as the second coupling hook 412 is coupled to the third coupling groove 350, the mounting plate 410 and the second cover 300 are coupled to each other secondarily. Accordingly, a coupling force between the mounting plate 410, the first cover 100, and the second cover 300 may be improved.

The first cover 100 may include a first hinge portion 130 rotating a portion of the first cover 100 during deployment of the airbag cushion 420. The second cover 300 may include a second hinge portion 320. The second hinge portion 320 is located at a portion of the second cover 300 corresponding to the first hinge portion 130 and rotates a portion of the second cover 300 with a portion of the first cover 100 during deployment of the airbag cushion 420.

When the plurality of first coupling hooks 411 is partially released from the coupled state during deployment of the airbag cushion 420, the first cover 100 and the second cover 300 may be rotated in a direction intersecting a deployment direction of the airbag cushion 420.

In order to prevent the first cover 100 and the second cover 300 from being damaged due to rotating forces thereof, the first cover 100 may include the first hinge portion 130 and the second cover 300 may include the second hinge portion 320 at the portion thereof corresponding to the first hinge portion 130.

The first cover 100 is rotated on the first hinge portion 130 and the second cover 300 is rotated on the second hinge portion 320, so that the emblem 200 and the light emitting module 500 provided between the first cover 100 and the second cover 300 may be protected.

The emblem 200 may include fourth coupling grooves 210 formed by penetrating portions of the emblem 200 in contact with the first cover 100. The first cover 100 may include first welding protrusions 140 at portions of the first cover corresponding to the fourth coupling grooves 210. The first welding protrusions protrude toward the emblem 200 and are welded in an inserted state in the fourth coupling grooves 210 to couple the emblem 200 to the first cover 100.

The emblem 200 may have the fourth coupling grooves 210 in order to be coupled to the first cover 100, and the fourth coupling grooves 210 are formed by penetrating the portions of the emblem 200 in contact with the first cover 100. The first cover 100 may have the first welding protrusions 140 extended toward the emblem 200.

The first welding protrusions 140 may be welded after being inserted into the fourth coupling grooves 210 to couple the first cover 100 to the emblem 200. Accordingly, the light emitting module 500 located between the first cover 100 and the emblem 200 may be fixed.

The first cover 100 may include fifth coupling grooves 150 formed by penetrating portions of the first cover 100 in contact with the second cover 300. The second cover 300 may include second welding protrusions 330, which are formed on portions of the second cover corresponding to the fifth coupling grooves 150 and protruding toward the first cover 100 and are welded in an insertion state in the fifth coupling grooves 150, thereby coupling the first cover 100 to the second cover 300.

The second cover 300 has the second welding protrusions 330 extended toward the first cover 100 in order to couple the first cover 100 to the second cover 300, and the first cover 100 has the fifth coupling grooves 150 formed by penetrating the portions of the first cover corresponding to the second welding protrusions 330. The second welding protrusions 330 may be fixed by welding after insertion into the fifth coupling grooves 150.

Therefore, the first cover 100 and the second cover 300 may be securely coupled to each other, whereby the emblem 200 and the light emitting device 530 located between the first cover 100 and the second cover 300 may be fixed.

The driver airbag with an emblem includes the light emitting module 500, which is located between the first cover 100 and the emblem 200 and is supplied with electricity to emit light toward the emblem 200. The light emitting module 500 may include: an electric wire 510 connected to a power apparatus of the vehicle; a circuit board 520 connected to the electric wire 510 and converting electric power to an electric signal; the light emitting device 530 connected to the circuit board 520 and emitting light; and a lens 540 dispersing the light of the light emitting device 530.

The light emitting module 500 may include the electric wire 510 supplied with electricity from the power supply of the vehicle, the circuit board 520 connected to the electric wire 510, the light emitting device 530 connected to the circuit board 520, and the lens 540 dispersing the light of the light emitting device 530.

When the vehicle starts up, electricity is applied to the light emitting module 500 via the electric wire 510, and the light emitting device 530 may emit various colors of light by the circuit board 520.

The light emitting device 530 may be formed in a lighting device capable of emitting light, such as LED lights, and the lens 540 may guide the light of the light emitting device 530 to be emitted in a desired direction of a manufacturer.

Therefore, the emblem 200 mounted to the steering wheel of the vehicle may emit light.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A driver airbag, comprising:
a first cover mounted to a steering wheel of a vehicle;
an emblem disposed on the first cover;
a second cover disposed on the first cover, connected to the first cover or the steering wheel, and having an emblem hole at least partially exposing the emblem; and an airbag module connected to the steering wheel and configured to, when activated, rotate the first or second cover and deploy an airbag cushion toward a front of a driver of the vehicle, wherein the airbag module comprises a mounting plate coupled to the steering wheel, and the first cover or the second cover is coupled to the mounting plate, and wherein the mounting plate comprises a first coupling hook protruding outwardly, the first cover has a first coupling groove located corresponding to a location of the first coupling hook, and the first coupling hook is inserted into the first coupling groove.

2. The driver airbag of claim 1, wherein the first coupling hook includes an inclined portion having an inclined surface.

3. The driver airbag of claim 1, wherein:
the first cover comprises a first hinge portion configured to rotate a portion of the first cover when the airbag cushion is deployed, and
the second cover comprises a second hinge portion located corresponding to a location of the first hinge portion and configured to rotate a portion of the second cover when the airbag cushion is deployed.

4. The driver airbag of claim 1, further comprising a light emitting module coupled between the first cover and the emblem and configured to emit light toward the emblem, wherein the light emitting module comprises:
an electric wire connected to and transmitting electric power from a power apparatus of the vehicle;
a circuit board connected to the electric wire and configured to convert the electric power to an electric signal;
a light emitting device connected to the circuit board and configured to emit the light; and
a lens configured to disperse the light emitted from the light emitting device.

5. The driver airbag of claim 1, wherein:
the second cover has a second coupling groove located corresponding to the location of the first coupling groove, and
the first coupling hook is inserted into the first coupling groove or the second coupling groove.

6. The driver airbag of claim 5, wherein the first coupling hook includes a bent portion inserted into the second coupling groove.

7. The driver airbag of claim 5, wherein the first cover includes an insertion rib located adjacent to the first coupling groove, extending outwardly and inserted into the second coupling groove.

8. The driver airbag of claim 1, wherein:
the mounting plate comprises a second coupling hook extending on an outer surface of the second cover toward the second cover,
the second cover has a third coupling groove located corresponding to a location of the second coupling hook, and
the second coupling hook is inserted into the third coupling groove.

9. The driver airbag of claim 8, wherein:
the emblem comprises a fourth coupling groove, and
the first cover comprises a first welding protrusion protruding toward the emblem from a portion of the first cover corresponding to a location of the fourth coupling groove and inserted in the fourth coupling groove.

10. The driver airbag of claim 9, wherein:
the first cover has a fifth coupling groove, and
the second cover has a second welding protrusion protruding toward the first cover from a portion of the second cover corresponding to a location of the fifth coupling groove and inserted in the fifth coupling grooves.

* * * * *